US006992615B2

(12) United States Patent
Eneroth

(10) Patent No.: US 6,992,615 B2
(45) Date of Patent: Jan. 31, 2006

(54) METHOD FOR VERIFYING DYNAMICALLY A MULTIPLE BEAM ANTENNA PLACED ON A VEHICLE

(75) Inventor: Anders Eneroth, Linghem (SE)

(73) Assignee: Totalforsvarets Forskningsinstitut, Stockholm (SE)

( * ) Notice: Subject to any disclaimer, the term of this patent is extended or adjusted under 35 U.S.C. 154(b) by 0 days.

(21) Appl. No.: 10/510,572

(22) PCT Filed: Apr. 11, 2003

(86) PCT No.: PCT/SE03/00591

§ 371 (c)(1), (2), (4) Date: Oct. 8, 2004

(87) PCT Pub. No.: WO03/087872

PCT Pub. Date: Oct. 23, 2003

(65) Prior Publication Data

US 2005/0151685 A1 Jul. 14, 2005

(30) Foreign Application Priority Data

Apr. 11, 2002 (SE) .................................. 0201094

(51) Int. Cl.
*G01S 7/40* (2006.01)

(52) U.S. Cl. .......................... 342/173; 342/42; 342/47; 342/58; 342/158

(58) Field of Classification Search ................ 342/165, 342/173, 13–15, 20, 42–48, 50, 51, 56, 58, 342/74–77, 81, 147, 157, 158
See application file for complete search history.

(56) References Cited

U.S. PATENT DOCUMENTS 4,090,199 A * 5/1978 Archer ...................... 342/373
5,175,558 A * 12/1992 DuPree ...................... 342/378

(Continued)

FOREIGN PATENT DOCUMENTS

EP 1351333 A2 * 10/2003

OTHER PUBLICATIONS

"Smart AGC: a new anti-jam device for military satellite system", Arnstein, D.S. Military Communications Conference, 1991. MILCOM '91, Conference Record, 'Military Communications in a Changing World'., IEEE Nov. 4-7, 1991 P(s):672-677 vol. 2.*

"Performance of satellite communication system with FH-MFSK under various jamming environments", Moon, S.; Kim, K. MILCOM 2001. Communications for Network-Centric Operations: Creating the Information Force. IEEE vol. 1, 2001 Ps: 659-663.*

"A high-directivity transponder using self-steering arrays", Miyamoto, R.Y.; Shiroma, G.S.; Murakami, B.T.; Shiroma, W.A. Microwave Symposium Digest, 2004 IEEE MTT-S International vol. 3, Jun. 6-11, 2004 P(s): 1683-1686.*

*Primary Examiner*—John B. Sotomayor
(74) *Attorney, Agent, or Firm*—Jacobson Holman PLLC

(57) ABSTRACT

A method for dynamically verifying a multiple beam antenna placed on a craft including a device for determining the position and course of the craft and a transmitter that via the antenna can emit pulsed signals. At least two transponders are placed in different directions round a measuring area with each transponder receiving a pulsed signal of at least one frequency, different for the different transponders, from the antenna. The transponders are adapted to send, after receiving the pulsed signal, a corresponding pulsed signal to the measuring station in such a manner that the transponder sending the signal can be determined at the measuring station which evaluates how well the antenna has managed to direct the radiated energy in the desired directions.

2 Claims, 5 Drawing Sheets

U.S. PATENT DOCUMENTS

| | | | | |
|---|---|---|---|---|
| 5,294,934 | A | 3/1994 | Matsumoto | 342/173 |
| 5,546,090 | A | 8/1996 | Roy, III et al. | 342/42 X |
| 5,579,016 | A * | 11/1996 | Wolcott et al. | 342/378 |
| 6,130,643 | A * | 10/2000 | Trippett et al. | 342/380 |
| 6,163,296 | A | 12/2000 | Lier et al. | 342/417 |
| 6,828,935 | B1 * | 12/2004 | Dunn et al. | 342/375 |

* cited by examiner

METHOD FOR VERIFYING DYNAMICALLY A MULTIPLE BEAM ANTENNA PLACED ON A VEHICLE

This is a nationalization of PCT/SE03/00591 filed Apr. 11, 2003 and published in English.

BACKGROUND OF THE INVENTION

1. Field of the Invention

The present invention relates to a method for dynamically verifying a multiple beam antenna placed on a craft. The method has been developed based on problems in building a military jamming system, but may of course be used in any other case where it is desirable to verify the properties of a multiple beam antenna.

2. Description of the Related Art

A military jamming system must be able to direct much radiated energy in precise directions round the transmitting antenna. The directions must be able to shift quickly. When such a system is built up or provided, it must, like in other cases, be possible to verify the properties of the components included by testing. Such a system comprises on the one hand a multiple beam antenna and, on the other hand, equipment for calculating and generating pulses in predetermined directions.

In a multiple beam antenna system, the emitted energy can be controlled by selecting one of a large number of transmitting beams. In order to direct the beam in the correct direction, information about position and heading of the antenna must be available. If the antenna is placed on a craft, instantaneous information is required.

Testing of a multiple beam antenna may take place in steps. A first test can be performed in a laboratory environment. After mounting in a craft, however, the antenna must finally be be tested under dynamic conditions, i.e. while the craft is moving.

SUMMARY OF THE INVENTION

The present invention relates to a method of verifying a multiple beam antenna placed on a craft, such as a ship. In such tests, the function of the antenna is verified under various sea conditions. A stabilising system, if any, will then also be fully tested.

A special problem arises when it is desirable to verify data of a multiple beam antenna when the equipment for calculating and generating pulses is not available. In this case, some kind of provisional solution must be prepared, allowing the function of the multiple beam antenna itself to be verified. The object of the present invention is to solve this problem.

Accordingly, the present invention is directed to a method for dynamically verifying a multiple beam antenna which is placed on a craft including a device for determining the position and course of the craft and a transmitter device which, via the antenna, can emit pulsed signals. Multiple transponders are placed in different directions round a measuring area within which the craft is intended to move, with each transponder being adapted to receive a pulsed signal of at least one frequency, different for the different transponders, via a receiving antenna which is capable of receiving incoming signals from the entire measuring area. A common measuring station is placed in connection with the measuring area, with the transponders being adapted to send, after receiving the pulsed signal, a corresponding pulsed signal to the measuring station in such a manner that it can be determined at the measuring station from which transponder each received signal comes. The craft is made to move within the measuring area, with the position and course of the craft being determined before a measuring sequence, with a measuring sequence being emitted from the craft via the antenna that is to be verified. The measuring sequence includes a reference signal from the craft to the measuring station, a first pulsed signal to the first transponder, a second pulsed signal to the second transponder etc., with the measuring station detecting the reference signal and the subsequent pulsed signals from the transponders. The measuring procedure is repeated while the craft is moving within the measuring area, and the measuring station calculates to what degree the antenna manages to direct signals in different directions round the craft for different frequencies.

Also according to the present invention, the different transponders can emit signals to the measuring station within different, mutually neighbouring, narrowband frequency ranges.

BRIEF DESCRIPTION OF THE DRAWINGS

The invention will now be described in more detail with reference to accompanying drawing, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is used to verify a multiple beam antenna that is placed on a craft. The craft has a device for determining its position and course and a transmitter that is able to emit pulsed signals via the antenna. The craft is intended to move within a predetermined measuring area. More than one transponder, in an example that will be described here four transponders, are placed in different directions round the measuring area. Each transponder is adapted to receive a pulsed signal of at least one frequency which differs between the different transponders. The transponders are provided with a receiving antenna that is capable of receiving incoming signals from the entire measuring area. Furthermore, a common measuring station is placed in connection with the measuring area.

The transponders are adapted to send, after receiving said pulsed signal, a corresponding pulsed signal to the measuring station. The time sequence of the signals may be used to distinguish the different signals at the measuring station. In a particularly suitable embodiment of the invention, the transponders emit signals to the measuring station within different, mutually neighbouring, narrow-band frequency ranges. In this way, the signals from different transponders will meet essentially the same wave propagation conditions on their paths to the measuring station At the same time the different frequencies of the signals give additional security when the signals are to be distinguished. In this case, a spectrum analyser may be used at the measuring station for analysing the signals. In the following examples, it is assumed that this technique involving different frequencies is used.

The craft is made to move within the measuring area, and the position and course of the craft are determined before a measuring sequence. A measuring sequence comprising a reference signal from the craft to the measuring station, a first pulsed signal to the first transponder, a second pulsed signal to the second transponder etc. are emitted from the craft via the antenna that is to be verified. The reference signal and the subsequent pulsed signals from the transponders are detected at the measuring station. While the craft is moving in the measuring area, a number of measuring sequences are emitted. Finally, measuring and calculating equipment at the measuring station calculates to what degree the antenna manages to direct signals in different directions round the craft for different frequencies.

Figure 1:
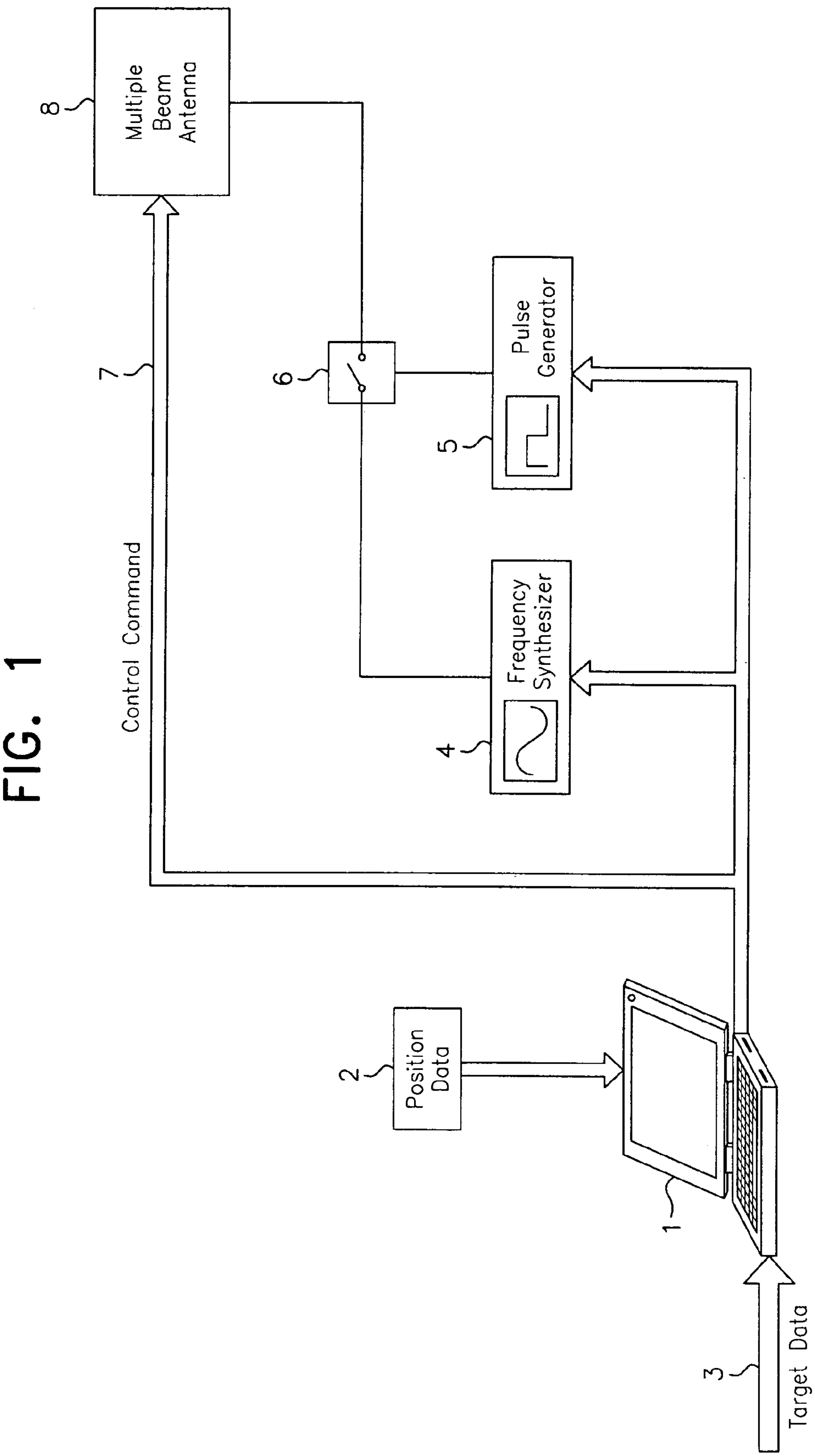
FIG. 1 shows a preferred embodiment of a ship's unit that is used in the invention.

The ship's unit is the unit controlling the entire testing process. The heart of the unit is a computer. FIG. 1 shows a preferred embodiment of the ship's unit where the computer 1 receives position data 2 in the form of GPS data and course of the ship continuously (for instance at a rate of 100 Hz). For each set of transponder positions, which may be the same for a long period of measuring, the GPS coordinates of the transponders are manually input in the computer as target data 3, i.e. positions to which the emitted energy is to be sent.

The computer 1 controls a frequency synthesizer 4 and a pulse generator 5 via a data bus, for instance a GPIB interface. The pulse generator controls a microwave switch 6 which generates microwave pulses of a predetermined length. A pulse sequence in which the different pulses have different frequencies is output from the microwave switch. The computer gives a control command (directional information) 7 to the multiple beam antenna 8 for each output pulse, based on the position and course of the ship and the position of the different transponder units. The system provides for a predetermined frequency to be sent to a selected transponder unit. Owing to the fact that both side bands can be utilised in the transponder units, two frequencies can be sent to each transponder unit.

To be able to observe received signals at the measuring station, the emitted pulse repetition frequency PRF must be adapted to the current geometry of the test. The difference in path of propagation between the different signal paths is dimensioning or the highest possible PRF that can be used.

Figure 2:
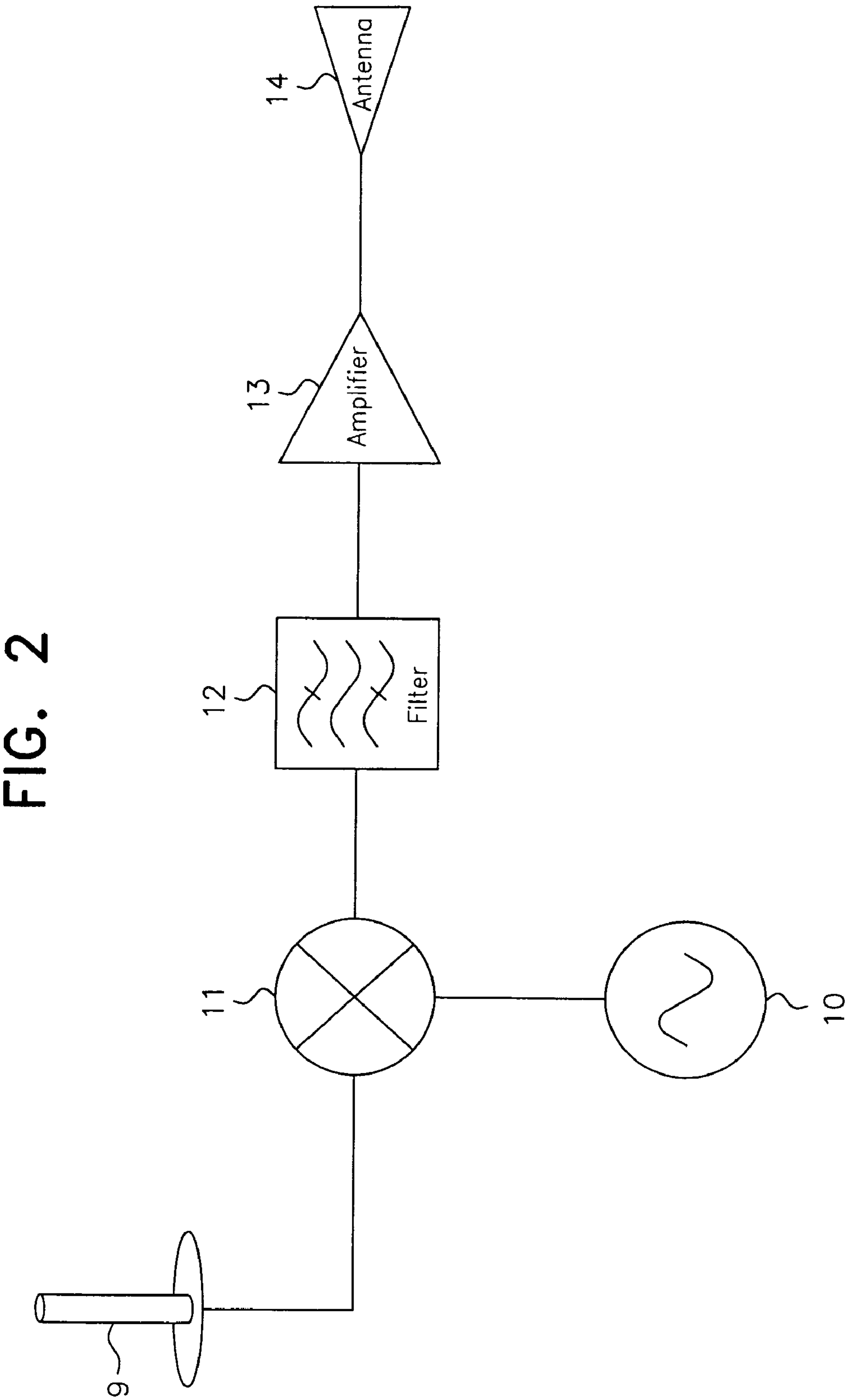
FIG. 2 shows a preferred embodiment of a transponder that is used in the invention.

FIG. 2 shows a transponder. The transponders consist of an omniantenna 9, a frequency stable oscillator 10, for instance a DRO (Dielectric Resonance Oscillator), for frequency conversion via a mixer 11, a band-pass filter 12, a power amplifier 13 and a directional antenna 14. The transponder has a unique frequency at which it operates and which is determined by the frequency of the oscillator. All transponders convert the input frequency to a frequency close to 12 GHz (separated about 10 MHz) which is linked on to the measuring station.

The receiving antenna 9 should have a beam that covers the current geometry of the ship movements provided by the target path. A simple amniantenna is a suitable alternative since the antenna gain should normally not constitute a problem. The transmitting antenna 14 suitably consists of an antenna horn with a narrow beam. This is feasible when only a fixed connection between two points is involved.

The received signal is mixed down or up to about 12 GHz which is sent on to the centrally arranged measuring station.

By selecting suitable frequencies, the multiple beam antenna can be tested over the entire frequency range and at optional angles. The table below indicates the frequency $f_{DRO}$ of the transponders, the tested frequency of the multiple beam antenna and the frequency for the transmission between transponder and measuring station.

| $f_{DRO}$ [GHz] | Multiple beam antenna frequency [GHz] | Transmitted frequency [GHz] | Multiple beam antenna frequency [GHz] | Transmitted frequency [GHz] |
|---|---|---|---|---|
| 5.02 | 17 | 11.98 | 7 | 12.02 |
| 4.04 | 16 | 11.96 | 8 | 12.04 |
| 3.06 | 15 | 11.94 | 9 | 12.06 |
| 2.08 | 14 | 11.92 | 10 | 12.08 |

The reference signal of the craft to the measuring station can be sent at, for instance, 12.4 GHz. The different frequencies make it possible to distinguish in the measuring unit the reference signal, which is there used as a trigger signal, and the different transponder signals. When the frequency sequence is known, the composition of received signals will allow identification of which transponder has possibly not emitted the correct signal.

In measuring, the reference signal may be used to start a counter that continuously counts the number of received pulses per reference pulse. This results in statistical data indicating the average of number of errors in the directioning of the multiple beam antenna.

Figure 3:
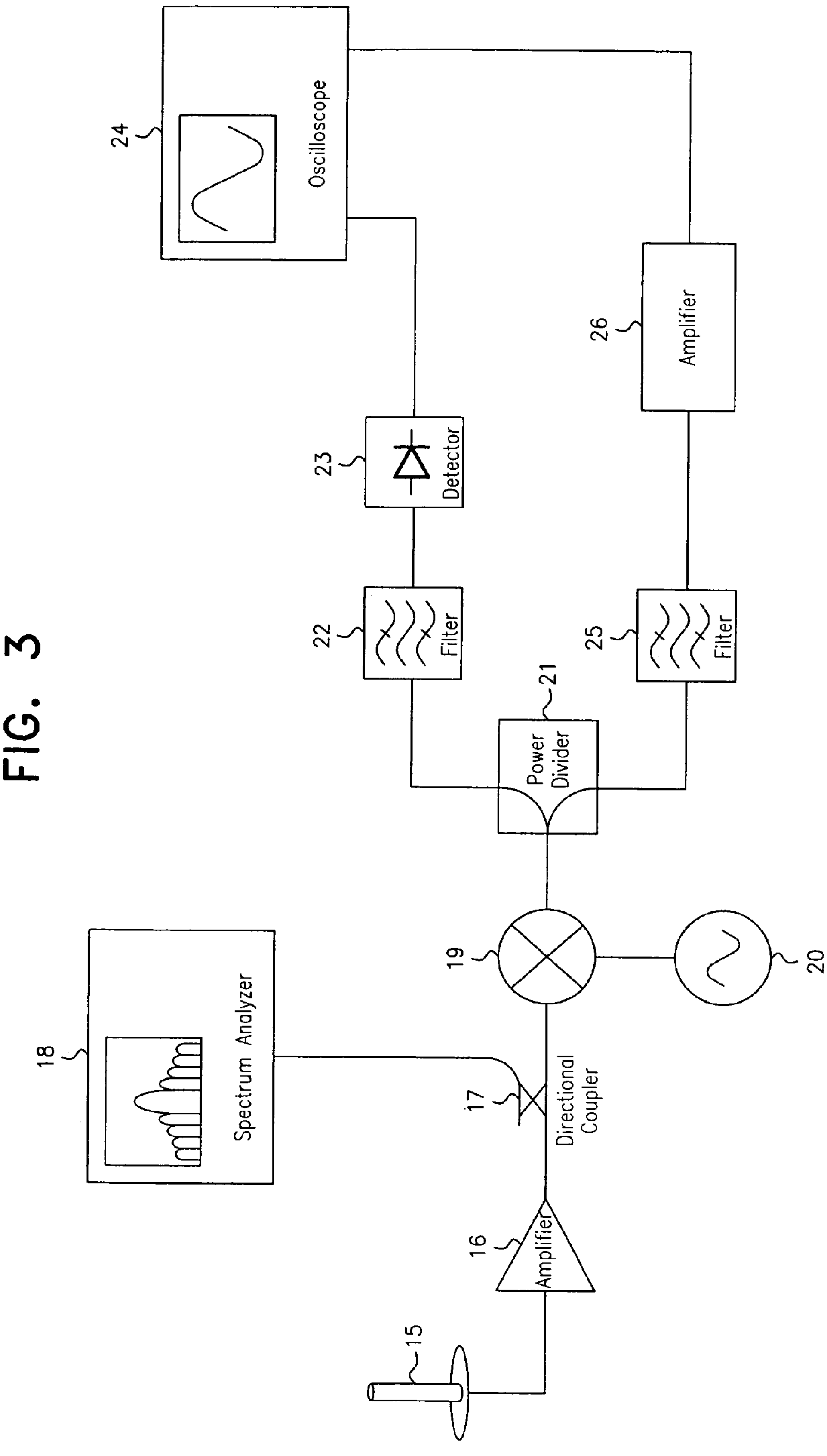
FIG. 3 shows a preferred embodiment of a measuring station that is used in the invention.

FIG. 3 shows an embodiment of the measuring station. The measuring station consists of an omniantenna 15, a preamplifier 16, a directional coupler 17, a spectrum analyser 18, a frequency stable oscillator 20 for frequency conversion by means of a mixer 19, a power divider 21, a band-pass filter 22, a detector 23, an oscilloscope 24, a band-pass fitter 25 and an amplifier 26 of the type Detector Loop Video Amplifier (DLVA). The reason why there is a conversion step in the measuring unit is the much greater selectivity that can be obtained since it is easier to separate reference signal and measuring signals by using steep filters.

The receiving unit converts the signal down to base band (in this case about 1 GHz). It is then possible to see in an oscilloscope which position does not function every time. By letting the spectrum analyser be set for integration of a number of sweeps, the level of each frequency component may represent how many of the outputs go wrong. This implies that the transponder units are adjusted in amplitude, so that the answers will be equal in terms of amplitude.

Figure 4:
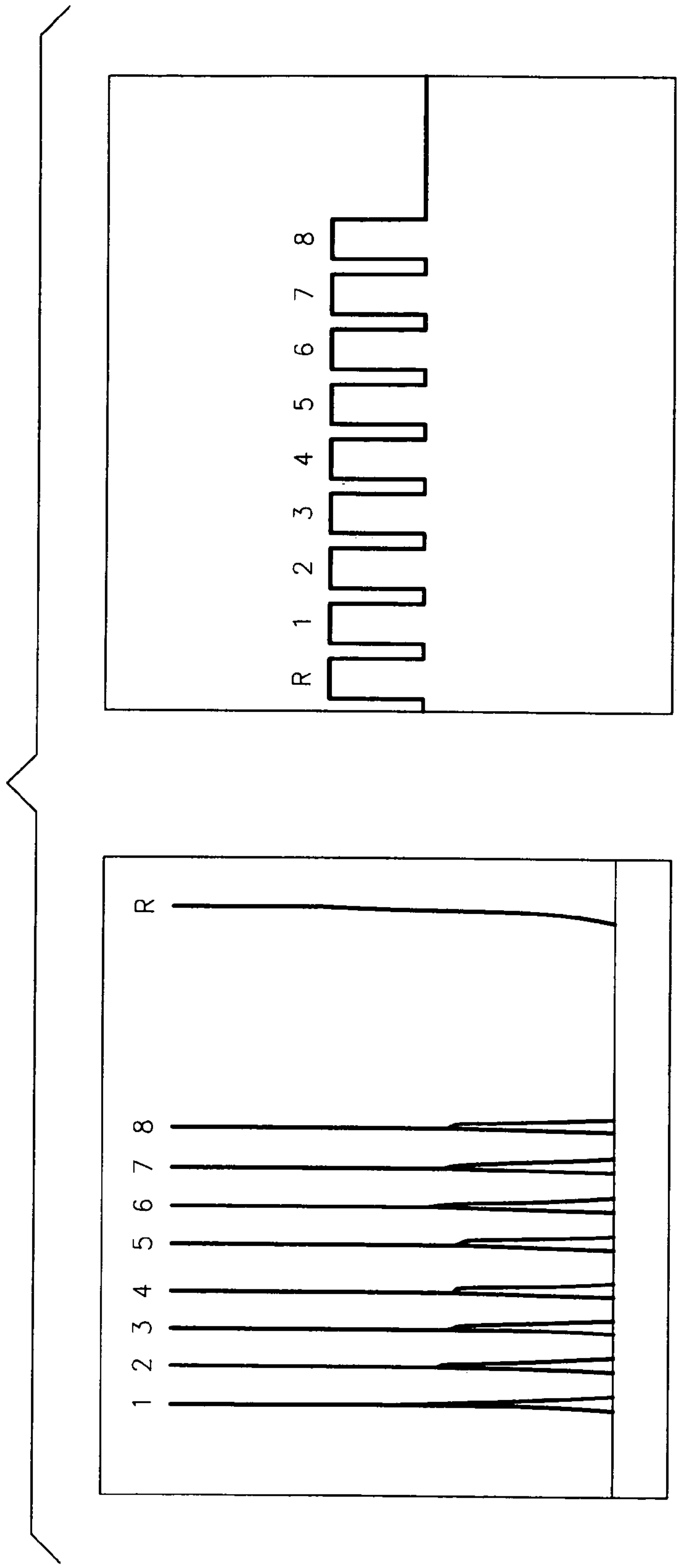
FIG. 4 shows a conceivable appearance of what is shown by a spectrum analyser (to the left) and an oscilloscope (to the right) while measuring according to the invention.

FIG. 4 shows a conceivable appearance of what is shown by the spectrum analyser (to the left) and the oscilloscope (to the right).

Figure 5:
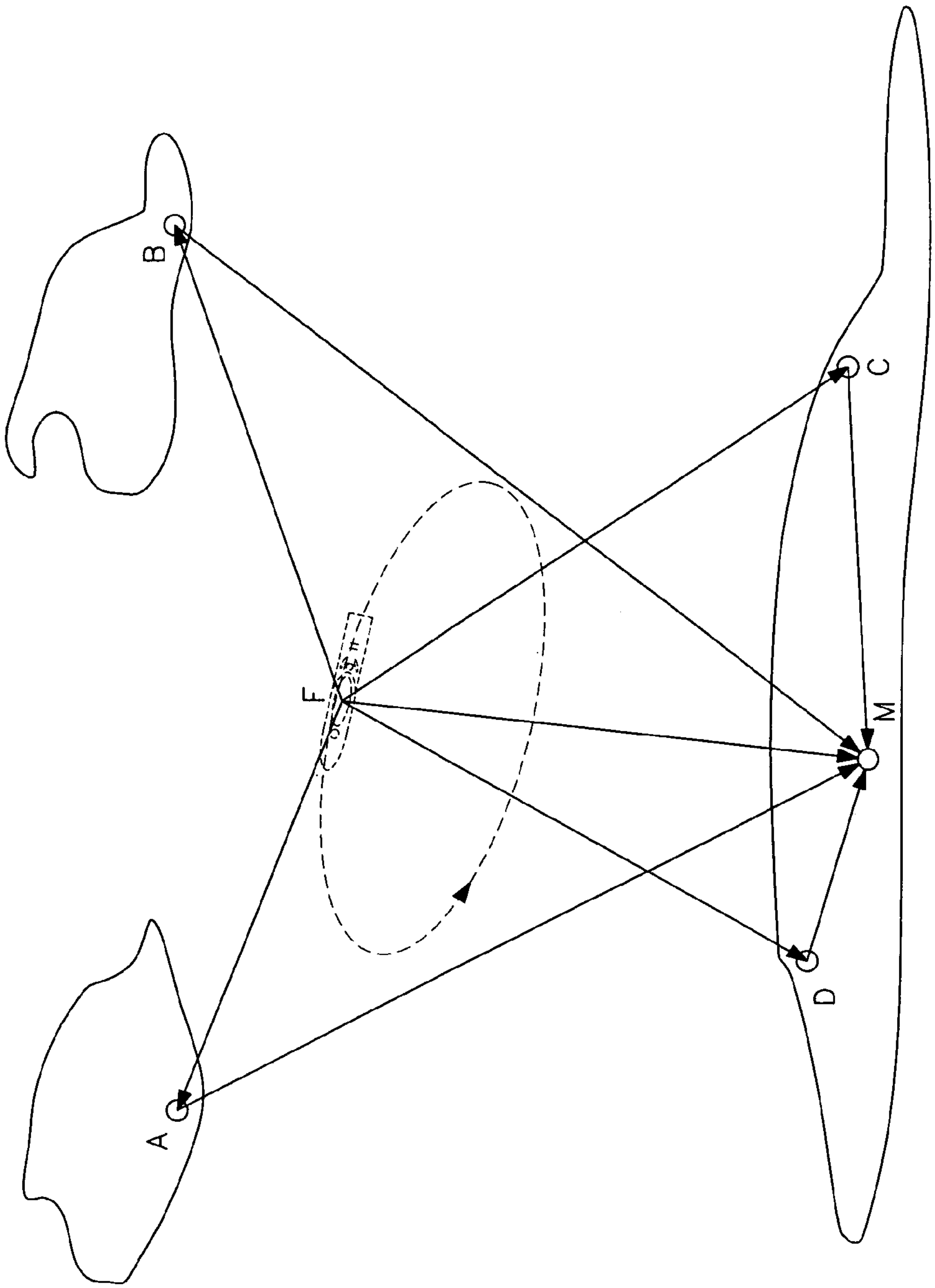
FIG. 5 shows what the geometry may look like round a ship while measuring according to the invention.

FIG. 5 shows what the geometry may look like round a ship whose multiple beam antenna is to be verified. The ship is designated F, the transponders A, B, C, D and the measuring station M. When testing, the transmission between transponder and measuring station must take multipath propagation into consideration so that fade-out does not take place at the frequency used. The height of the antenna adjacent to the transponder must be adjusted (small differences in height in a decimetre range are involved). This can be carried out in advance.

The system operates in a sequence that repeats itself continuously. The input values are the coordinates of the transponder units and their frequency channels, see Table 2.

| | Coordinate | Frequency 1 [GHz] | Frequency 2 [GHz] |
|---|---|---|---|
| Reference unit | $X_R$, $Y_R$ | 12.4 | — |
| Transponder A | $X_A$, $Y_A$ | 17 | 7 |
| Transponder B | $X_B$, $Y_B$ | 16 | 8 |
| Transponder C | $X_C$, $Y_C$ | 15 | 9 |
| Transponder D | $X_D$, $Y_D$ | 14 | 10 |

The testing sequence is as follows:

1. For each measuring sequence a set of navigation data is used, consisting of the current GPS position of the ship, as well as its course. Navigation data is used to calculate output directions towards each transponder unit and the reference unit.
2. The frequency synthesizer is directed to the reference frequency, and the pulse generator (which is set for generation of bursts of pulses) is triggered. The interval between the pulses in the burst is adjusted to the current geometry so that the received pulses at the measuring stations do not overlap.
3. The reference signal is sent from the multiple beam antenna to the measuring unit. There the signal is detected in the special channel that has a fairly narrow band-pass filter for, in this example, 12.4 GHz. The detected pulse gives a trigger pulse that is input in the oscilloscope and other recording equipment.
4. The frequency synthesizer is quickly shifted to the first frequency (17 GHz) which is sent to the transponder A.
5. The pulse is received by an omnidirectional antenna 9 in the transponder A and is converted to essentially 12 GHz (11.98 GHz). The pulse is amplified and sent via a arrow beam x-band horn antenna 13 that is directed to the measuring station M.
6. The measuring station receives the 12 GHz signal from the transponder A, which is detected in a DLVA (Detector Loop Video Amplifier). The video signal from the DLVA is sent on to the oscilloscope and other recording equipment.
7. The frequency synthesizer is quickly shifted to the second frequency (16 GHz) which is sent to the transponder B.
8. The pulse is received by an omnidirectional antenna 9 in the transponder B and is converted to essentially 12 GHz (11.96 GHz). The pulse is amplified and sent via a narrow beam x-band horn antenna 13 that is directed to the measuring station M.
9. The measuring station receives the 12 GHz signal from the transponder B, which is detected in a DLVA. The video signal from the DLVA is sent on to the oscilloscope and other recording equipment.
10. The same procedure for transponders C and D. Subsequently transmission at the lower frequencies to transponders A to D begins.
11. The measuring station M has received a total of 9 pulses and presented these on the oscilloscope and recorded them in, for instance, a measuring computer with data collecting equipment.
12. After a certain time, the procedure starts once more after new navigation data for the ship has been input.

The invention may also advantageously be used when testing airborne jamming transmitters with electrically controlled antennas. The difference is that this is a more complicated scenario. For calculation, also the height coordinates must be used. When testing for flying targets, the number of targets should be limited to one, or possibly two. The targets that are to be illuminated with jamming energy may consist of, for instance, helicopters provided with transponders.

The difference in connection with flying targets is that the link to the measuring unit must have an omnidirectional antenna. Moreover, the current position of the target must be linked to the jamming aircraft at a communication frequency.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method for dynamically verifying a multiple beam antenna which is placed on a craft comprising a device for determining the position and course of the craft, a transmitter device which via the antenna can emit pulsed signals, and a plurality of transponders placed in different directions round a measuring area within which the craft is intended to move, each transponder being adapted to receive a pulsed signal of at least one frequency, different for the different transponders, via a receiving antenna which is capable of receiving incoming signals from the entire measuring area, a common measuring station being placed in connection with the measuring area with the transponders being adapted to send, after receiving said pulsed signal, a corresponding pulsed signal to the measuring station in such a manner that it can be determined at the measuring station from which transponder each received signal comes, the craft moving within the measuring area with the position and course of the craft being determined before a measuring sequence, said measuring sequence being emitted from the craft via the antenna that is to be verified, said measuring sequence including a reference signal from the craft to the measuring station, a first pulsed signal to the first transponder, and a second pulsed signal to the second transponder with the measuring station detecting the reference signal and the subsequent pulsed signals from the transponders, said measuring procedure being repeated while the craft is moving within the measuring area, and said measuring station calculating to what degree the antenna directs signals in different directions round the craft for different frequencies.

2. The method as claimed in claim 1, wherein the different transponders emit signals to the measuring station within different, mutually neighbouring, narrow-band frequency ranges.

* * * * *